United States Patent Office 2,741,855
Patented Apr. 17, 1956

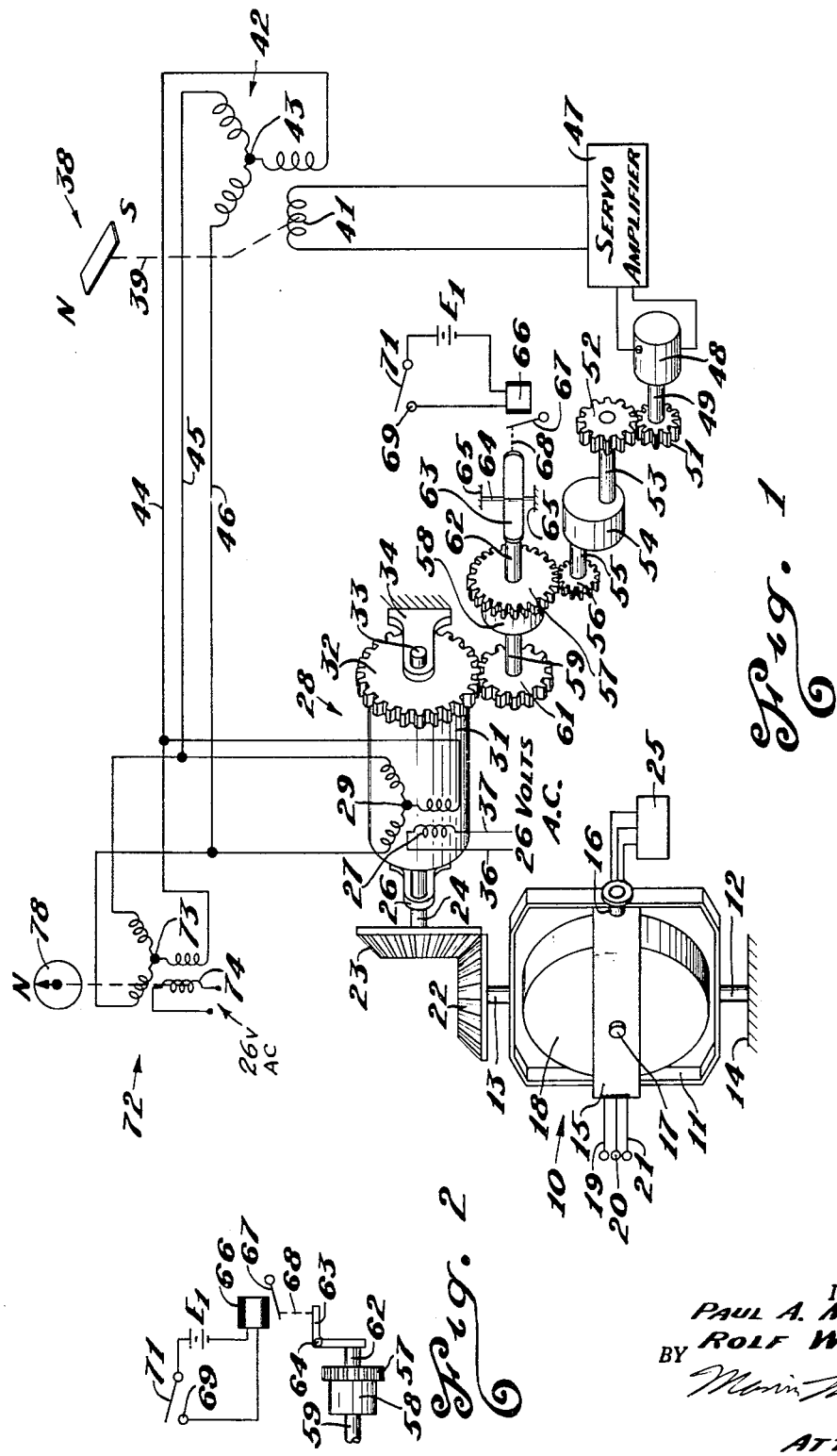

2,741,855

GYRO STABILIZED COMPASS

Paul A. McKinley and Rolf W. Wollan, Cedar Rapids, Iowa, assignors to Collins Radio Company, Cedar Rapids, Iowa, a corporation of Iowa Application November 10, 1952, Serial No. 319,638

4 Claims. (Cl. 33—222)

This invention relates in general to compasses, and in particular to a combination magnetic and gyro compass.

In navigation it is very important to maintain a true azimuth reference so that tracks may be made good over long distances. A compass has been developed which uses a horizontal gyro that is checked against a magnetic compass so as to obtain a comparison between them to eliminate drift caused by precessing of the gyroscopic compass and to eliminate instability of the magnetic compass. Such arrangements have customarily compared the magnetic compass position with the gyroscopic compass position and precessed the gyroscope by applying force to the inner gimbal in the correct direction so as to remove error between the positions of the two indicators. To precess the gyro requires a substantial force and is rather difficult because of the intricacies of gyros.

It is a feature of the present invention to allow the gyro to drift freely about its vertical axis and position the stator of a synchro-transmitter with an error signal obtained from comparing the outputs of the magnetic and gyro devices, rather than positioning the gyro itself.

It is an object of the present invention therefore to provide a gyro-magnetic compass wherein indicated errors between the two devices are corrected by moving the stator relative to the rotor of a synchro-transmitter, rather than by precessing the gyro.

Another object of the present invention is to provide a correcting system for a gyro-magnetic compass which integrates errors caused by rapid fluctuations of the magnetic compass and which operates with a relatively small amount of power.

Yet another object of this invention is to provide a gyro-magnetic compass wherein the gyro has no absolute reference but whose output is compared to the magnetic compass to position the stator of a servo transmitter to a reference position.

Yet another object of this invention is to provide a quick-slave means in a gyro-magnetic compass.

Further objects, features and advantages of the invention will become apparent from the following description and claims when read in view of the drawings, in which:

Figure 1 is a schematic drawing of the gyro-magnetic compass of this invention, and Figure 2 is a detailed view of the quick-slaving control system.

Figure 1 illustrates a gyroscope designated generally as 10 which has an outer gimbal ring 11 supported on vertical stub shafts 12 and 13. The shaft 12 is rotatably supported in a suitable base 14 which may be mounted on a craft which it is desired to navigate, as for example, an airplane.

An inner gimbal ring 15 is supported on horizontal stub shafts 16 which are rotatably supported in the outer gimbal ring 11. A second horizontal shaft 17 is mounted in ring 15 at right angles to shaft 16 and supports the rotor 18 of the gyro.

It is to be realized, of course, that the gyro 10 may be any standard directional gyro, including a driving motor that may be furnished power by the leads 19, 20 and 21. For example, 26 volt, three-phase power may be fed to the rotor through suitable slip rings mounted on the shaft 16. An erection motor 25 is connected electrically to a switch that is mechanically connected to the inner gimbal which holds the axis 17 substantially horizontal. Erection systems are well known to those skilled in the art and will not be described in detail herein.

The shaft 13 carries a beveled gear 22 at its upper end thereof which meshes with a second beveled gear 23 mounted on a horizontal shaft 24 which passes through a suitable supporting bearing 26 and is connected to a rotor 27 of a synchro-transmitter, designated generally as 28. The stator 29 of the synchro-transmitter may comprise three windings connected in Y which are fixedly mounted to the case 31 of the synchro-transmitter.

A gear 32 is fixedly mounted to the case 31 and a suitable shaft 33 extends from the case and is supported in a suitable support bearing 34. It is to be realized that the support bearings 26 and 34 are connected to the aircraft or vehicle being controlled.

A pair of output leads 36 and 37 are connected to the rotor 27 of the synchro-transmitter and a suitable voltage source as, for example, 26 volt A. C., is connected thereto.

A magnetic compass is shown schematically as a polar magnet 38 which is mounted for pivotal motion about a vertical axis 39 and might be mounted, for example, on the wing of an aircraft so as to isolate it as much as possible from magnetic disturbances on the aircraft.

The shaft 39 is connected to a rotor 41 of a servo resolver designated generally as 42. The resolver 42 has a three-phase stator 43 connected in Y with each of the windings connected, respectively, by leads 44, 45 and 46 to the windings 29 of the servo transmitter 28.

The output of rotor 41 is supplied to a servo amplifier 47 which is connected to a motor 48. The output of the motor 48 is coupled to the gear 32 so as to drive the stator 31. This coupling is accomplished through a number of gears and shafts so as to reduce and vary the speed of the motor. For example, the motor shaft 49 is connected to a first gear 51 which in turn meshes with a second gear 52 mounted on a shaft 53.

The shaft 53 is mounted in a gear reduction box 54 which has an output shaft 55 that carries a gear 56. The gear 56 engages gear 57 of a variable speed transmission 58. An output shaft 59 of the variable speed transmission supports a gear 61 that meshes with the gear 32.

As shown in Figure 2, the variable speed transmission 58 might be, for example, a two-speed transmission which has a shaft 62 that extends therefrom and which controls the gear ratio by longitudinal motion thereof. An L-shaped member 63 is pivotally supported at its corner by shaft 64 mounted in suitable brackets 65 connected to the aircraft.

A relay 66 controls the position of an armature 67 which is mechanically connected by a linkage 68 to the member 63 so as to move it from a first to a second position and thus control the two-speed transmission 58. The relay 66 has one side electrically connected to a battery $E_1$ and the other side connected to a terminal 69 which is engageable with a switch contact 71 that is connected to the battery $E_1$. When the switch 71 is closed the relay 66 will be actuated, thus causing the member 63 to shift the transmission 58.

A repeater system designated generally as 72 has a three-phase stator winding 73 connected in Y fashion which is connected to the stator windings 29 and 43 of the resolvers 28 and 42. The rotor 74 of the repeater system 72 is rotatably mounted and is electrically energized from a suitable source of alternating current as indicated. An indicator, including a rotatable pointer movable over a suitably calibrated scale, is mechanically connected to the rotor 74 as indicated by the dashed lines. The repeater 72 is illustrated as a synchro motor driving a pointer; however, this is considered to be illustrative only and any other suitable type of synchro repeater such as a synchro transformer and an associated torque amplifier for driving the pointer may be substituted therefor. The indicator 78 may be remotely located with respect to the remaining portions of the system such as on the instrument panel to indicate the heading of the aircraft.

In operation, power is supplied to the leads 19, 20 and 21 to start and operate the rotor of the gyro. The erection system 25 is connected to a power supply to stabilize the shaft 17 so that it is horizontal in a well known fashion. When the gyro is operating and erected, the stator 31 of the resolver synchro-transmitter will generally have to be adjusted to obtain initial slaving.

Since this is desired in a more or less rapid manner, the switch 71 is closed so as to shift the variable transmission 58 into high speed operation. Any error or discrepancy between the induced voltages in the windings 29 and the physical position of rotor 41 will be compared and induce an error voltage in the winding 41 which position is controlled by the geographic orientation of magnet 38.

This error signal will be amplified by the amplifier 47 and cause the motor 48 to run and position the stator 31 of the servo transmitter through the gearing mechanism shown.

When the stator 31 is rotated until the induced voltage in the winding 41 is zero, the initial slaving has been completed. Then the switch 71 is opened causing the variable speed transmission 58 to return to its normal low speed position.

Once the magnetic compass element 38 and the gyro have been slaved in the above described fashion, the system will be stabilized by the high gear ratio between the error signal applied to the motor 48 and stator 31. The low frequency oscillations of the gyro will be substantially integrated out due to tracking by the motor 48, and the high frequency fluctuations of the magnetic compass will be integrated due to the high gear ratio. In other words, the correction applied to the stator 31 through the gearing from the motor 48 will be slow enough so that the rapid fluctuations of the compass are not tracked but will be fast enough so that the relatively low frequency variations and oscillations of the gyro will be tracked. Thus, the indicated reading of meter 78 will have many of the errors eliminated.

Some of the advantages of the present invention are:

(1) The power required to adjust the position of the stator 31 is much less than that required to precess the gyro assembly.

(2) Since the system is synchronized by rotating the stator of the synchro-transmitter rather than by rotating the gyro itself, the gyro need not be caged when correction is made and the gyro may therefore be substantially simplified resulting in less inertia in the gyro assembly.

(3) The gyro may be mounted in any horizontal position in any convenient location in the aircraft.

To understand how changes in direction are indicated once the apparatus has been slaved, let it be assumed that a 30 degree turn is made. Since the axis 17 will maintain its absolute direction, the shaft 13 will rotate 30 degrees relative to the aircraft, thus causing the rotor 27 to be rotated 30 degrees. Simultaneously, however, the rotor 41 will be rotated 30 degrees by the change in position of the magnetic compass 38, and no error signals will be generated. A voltage will be induced in winding 74 which will change the indicated heading by 30 degrees.

Once slaved, the system corrects for high frequency fluctuations in the magnetic compass and low frequency fluctuations in the gyro. The response to changes in craft heading are instaneous and are immediately indicated by the meter 78.

It is seen that this invention provides an improved gyromagnetic compass of a substantially simplified construction and in which the errors of the magnetic fluctuations and the low frequency oscillations of the gyroscope have been substantially eliminated.

Although this invention has been described with respect to particular embodiments thereof, it is not to be so limited as changes and modifications may be made therein which are within the full intended scope of the invention, as defined by the appended claims.

We claim:

1. A gyro-magnetic compass comprising a free horizontal gyro, a synchro-transmitter having a stator and a rotor and both said stator and said rotor rotatably mounted, with said rotor mechanically connected to said free gyro, a power supply electrically connected to said rotor, a pair of synchros having rotors and stators, the stators of said pair of synchros connected electrically to the stator of said synchro-transmitter, an indicating means, said indicating means connected mechanically to the rotor of a first one of said synchros, a free magnetic compass element mechanically connected to the rotor of the other synchro, a driving means, said driving means controlled electrically by the rotor voltage of said other synchro, and said driving means connected mechanically to rotate the rotatable stator of said synchro-transmitter so that the rapid fluctuations inherent in said compass are not followed, but that the drift of said free gyro is corrected.

2. A stabilized gyro-magnetic compass comprising a free horizontal gyro, a synchro-transmitter having stator and rotor, and supported for rotary motion of both stator and rotor, the rotor of said synchro-transmitter connected to the vertical shaft of said free horizontal gyro, a voltage supply connected to the rotor of said synchro-transmitter, a pair of synchros each having stators and rotors, the stators of said pair of synchros connected electrically to the stator of said synchro-transmitter, an azimuth indicating means connected to the rotor of the first of said pair of synchros, a free magnetic field responsive element mounted for pivotal motion in the horizontal plane, the rotor of the second of said pair of synchros mechanically connected to said magnetic field responsive element, a driving means receiving an electrical input from the rotor winding of said second synchro, a variable speed transmission connected to the output shaft of said driving means, the output of said variable speed transmission connected to the stator of said synchro-transmitter to rotate it, and means for shifting the variable speed transmission so as to change the transmission ratio between the driving means and said stator whereby fluctuations inherent in said magnetic field responsive element will be discarded by the system at the lower speed transmission, yet rapid slaving of the system will occur at the higher speed transmission.

3. A stabilized gyro-magnetic compass comprising a free horizontal gyro, a synchro-transmitter with both the stator and the rotor supported for rotary motion, the rotor of said synchro-transmitter connected to the vertical shaft of said horizontal gyro, a first voltage supply connected to the rotor of said synchro-transmitter, a pair of synchros each having rotors and stators, the stators of said pair of synchros connected electrically to the stator of said synchro-transmitter, an azimuth indicating means connected to the rotor of the first synchro, a free magnetic field responsive element mounted for pivotal motion, the rotor of said second synchro mechanically connected to said magnetic field responsive element, a servo-amplifier connected electrically to the output of the rotor of said second synchro, a driving means receiving an electrical input from said servo-amplifier, a gear reduction connected to the output shaft of said driving means, a variable speed transmission connected to said gear reduction, the output shaft of said variable speed transmission connected to the stator of said synchro-transmitter to rotate it, means for shifting the variable speed transmission so as to change the transmission ratio between the driving means and said stator whereby random fluctuations of said magnetic field responsive element will be faster than the response speed of the compass with the lower speed transmission, yet the compass can be adjusted rapidly at a higher speed transmission, said shifting means comprising a shifting shaft extending from said variable speed transmission, a lever pivotally supported with one end engageable with said shifting shaft, an electro-magnetic relay with its armature mechanically connected to said lever, a second voltage source connected to said relay, and a switch connected to said relay and said second voltage source to actuate the relay to shift the variable speed transmission.

4. A gyro-stabilized compass comprising support means, a magnetic compass having output means, a horizontal gyroscope having an output member displaced proportionally to the relative motion between said gyroscope and said support, a two-part inductive transmitter having one of said parts coupled to said gyroscope output member, an energizing winding on one of said parts and connected electrically to an alternating current source, an induced winding on the other of said parts for transmitting an electrical gyroscope position signal which is characteristic of the relative position of said two parts, an inductive receiver having a first part mounted on said support means, a first receiver winding on said first part electrically connected to said induced winding for receiving said electrical signal, movable means operatively connected with said compass output means and having a second receiver winding for developing an electrical error signal proportional to the non-correspondence of said gyroscope position signal and compass output means, servo means energized by said error signal drivingly connected to the other of said parts of said two-part inductive transmitter to displace the same and thereby reduce said error signal to zero, and output means connected with said induced winding.

References Cited in the file of this patent

UNITED STATES PATENTS

| | | |
|---|---|---|
| 2,308,566 | Noxon | Jan. 19, 1943 |
| 2,614,335 | Noxon | Oct. 21, 1952 |

FOREIGN PATENTS

| | | |
|---|---|---|
| 49,251 | France | Nov. 12, 1938 |
| | (1st Addition to No. 793,301) | |